(No Model.)

W. BUSCHMANN & C. C. E. VAN ALSTINE.
LIQUID SCALES.

No. 437,899. Patented Oct. 7, 1890.

Witnesses
Alfred B. Watson
H. Inglis

Inventor
W. Buschmann
Cornelius C. E. Van Alstine
John Inglis atty

UNITED STATES PATENT OFFICE.

WILLIAM BUSCHMANN AND CORNELIUS C. E. VAN ALSTINE, OF PATERSON, NEW JERSEY.

LIQUID-SCALES.

SPECIFICATION forming part of Letters Patent No. 437,899, dated October 7, 1890.

Application filed May 17, 1890. Serial No. 352,118. (No model.)

*To all whom it may concern:*

Be it known that we, WILLIAM BUSCHMANN and CORNELIUS C. E. VAN ALSTINE, citizens of the United States, residing at Paterson, Passaic county, State of New Jersey, have invented a new and useful Improvement in Liquid-Scales, of which the following is a specification, reference being had to the accompanying drawings, forming a part thereof.

The object of our invention is a simple, cheap, and reliable liquid-scales. The objects sought we attain by devices illustrated in the accompanying drawings, which will be hereinafter fully described and claimed, in which—

Figure 1:
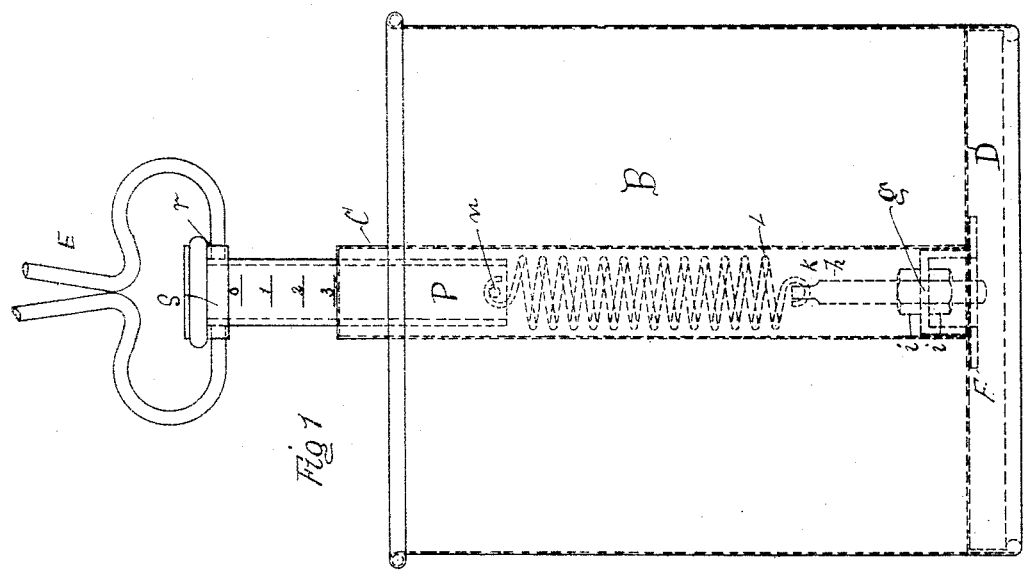
Figure 2:
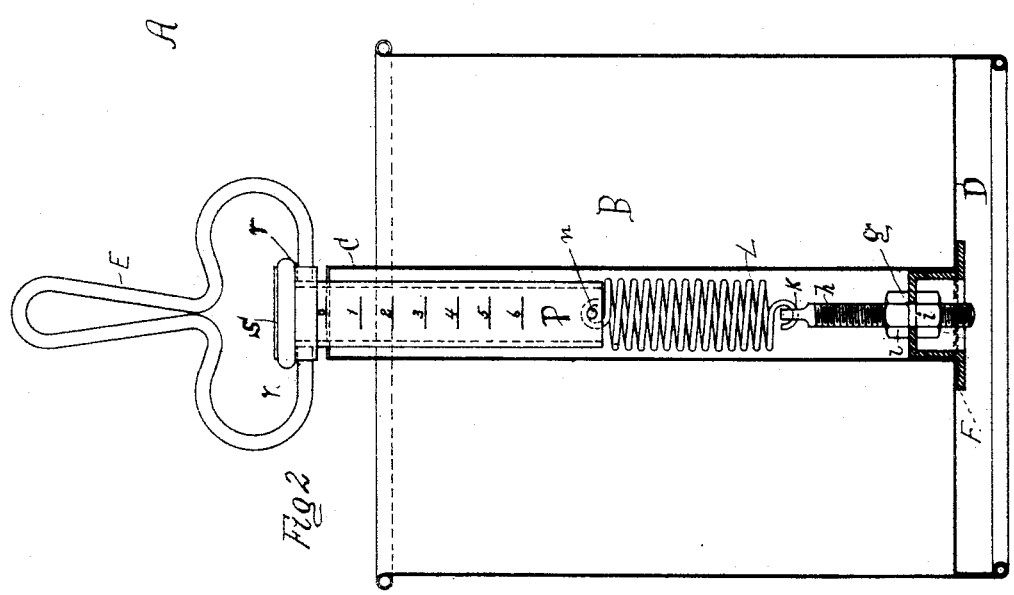

Figure 1 shows the device in elevation, a portion of the handle being removed in such figure; and Fig. 2 is a sectional elevation of the same.

A represents a liquid-scales having a receptacle B, as shown. The receptacle B, which is supposed to be cylindrical, but which may be of any other suitable form, is provided centrally with a tube C, which latter is soldered or otherwise secured to the bottom D of the receptacle B and centrally thereon. The tube C, secured to the bottom D of the receptacle and in a central position thereto to give balance to the device when the same is suspended by the handle E, projects above the top of the receptacle and forms the line 0, (zero,) as shown in Fig. 2.

Within the tube C, at the bottom of the same, is arranged a hat-shaped frame F, the rim or flange portion of which hat or frame passes outward under the bottom of the receptacle to form a seat therefor, as shown.

The crown portion of the hat or frame is provided with orifice $g$, in which latter is arranged eye-screw $h$, having screw-nuts $i$, one of which nuts is placed above the crown of the hat or frame F, and the other below the same on the screw $h$, as shown.

In the eye $k$ of the eye-screw $h$ is arranged the lower end of a helical spring L, which spring at its upper end connects with an index-rod P by a pin $n$, the rod having marks and figures, as shown, and a handle E, before referred to, which handle is arranged to turn in eyes $r$, formed therefor in the cap $s$ of the index-rod P.

The device is suspended by passing the hand through the wide portions of the handle when the same is in the erect position shown, or may be lifted by the hand by turning the handle proper down in horizontal position. When the device is suspended by either of the ways mentioned, the fluid is poured into the receptacle B, which latter, by its increased weight caused by the entrance of the fluid, distends the spring L, settles down and indicates the number of pints of beer, &c., as in Fig. 1. When the receptacle is relieved of its contents, it, under the contracting influence of the spring, ascends to its normal position at the line zero.

By means of screw $h$ and nuts $i$ the action of the spring L can be adjusted to give more or less tension to the same to suit the weight and keep the line zero in position at the top of the tube, as in Fig. 2.

The device may be made of any material or materials that are adapted to such use.

Having described our invention, we claim as new, and desire to secure by Letters Patent, in a liquid-scale—

The combination of receptacle B and tube C, connected centrally therewith, the frame F, screw $h$, the index-rod P, having handle E, and spring L, interposed between the screws and index-rod and connected therewith, substantially as shown and described.

WILLIAM BUSCHMANN.
CORNELIUS C. E. VAN ALSTINE.

Witnesses:
JOHN INGLIS,
H. INGLIS.